E. R. SEWARD.
LATHE.
APPLICATION FILED JULY 28, 1915.

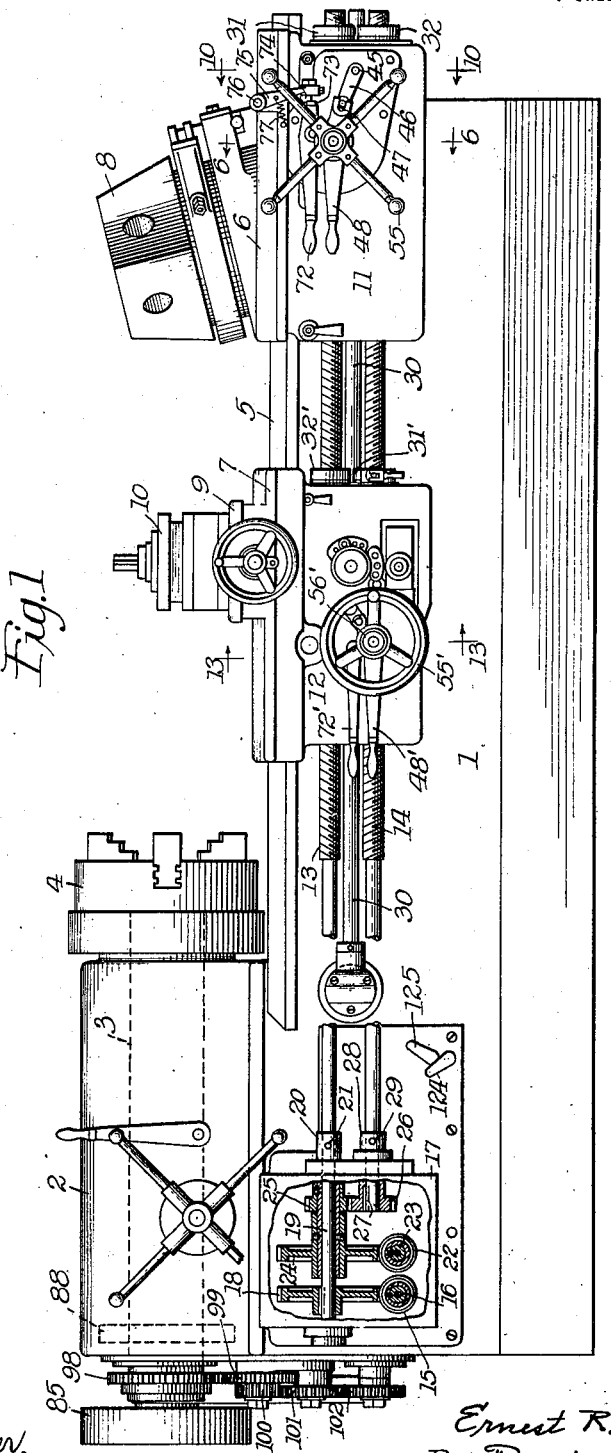

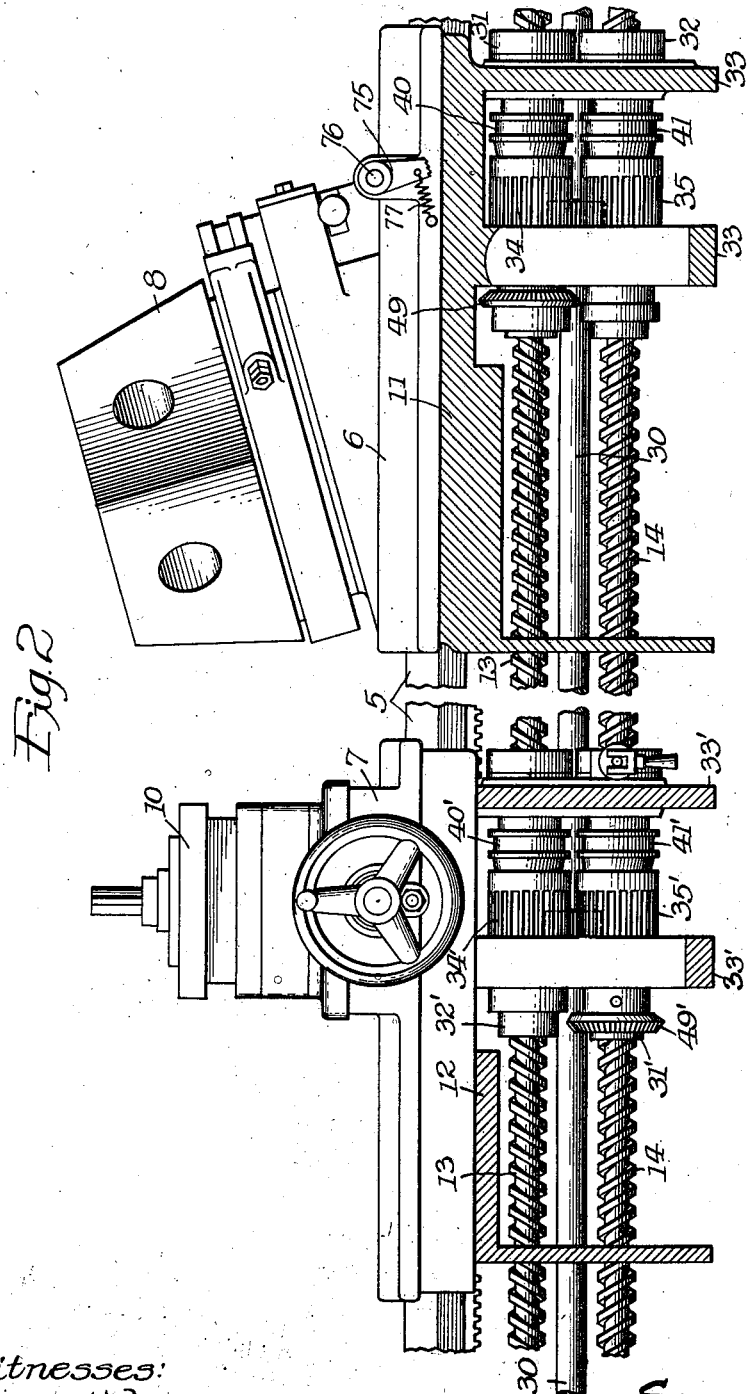

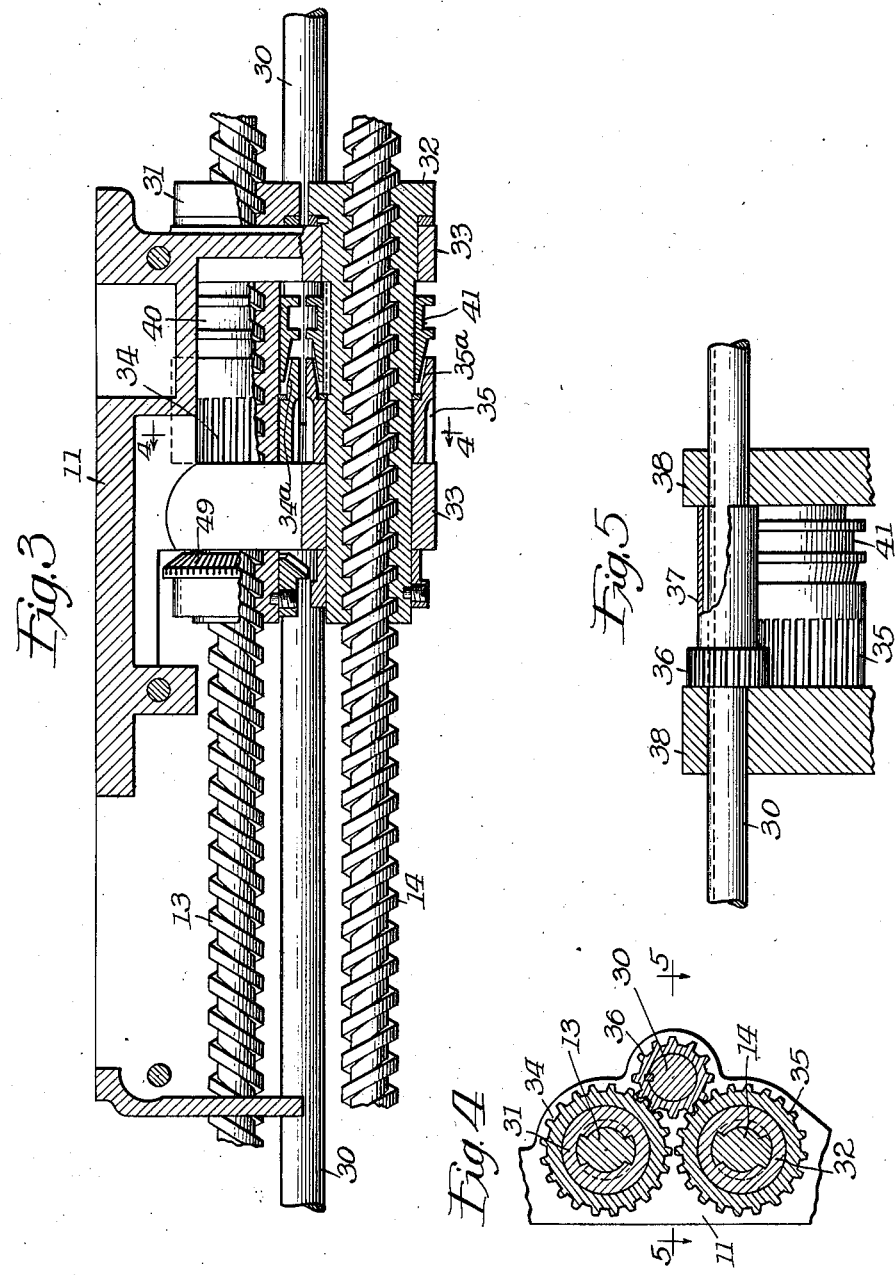

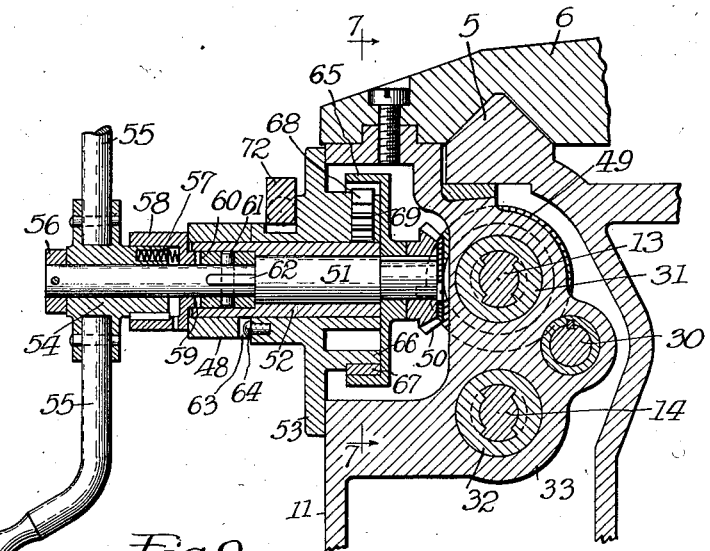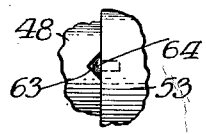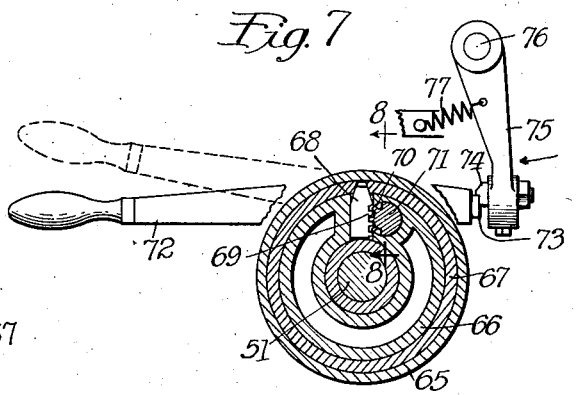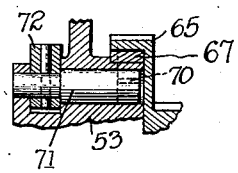

1,164,759.

Patented Dec. 21, 1915.
7 SHEETS—SHEET 5.

Witnesses:
Leonard W. Novander

Inventor
Ernest R. Seward,
By Pond & Wilson
Att'ys

E. R. SEWARD.
LATHE.
APPLICATION FILED JULY 28, 1915.

1,164,759.

Patented Dec. 21, 1915.
7 SHEETS—SHEET 6.

Witnesses:
Leonard W. Novander.

Inventor
Ernest R. Seward,
By Pond & Wilson,
Att'ys

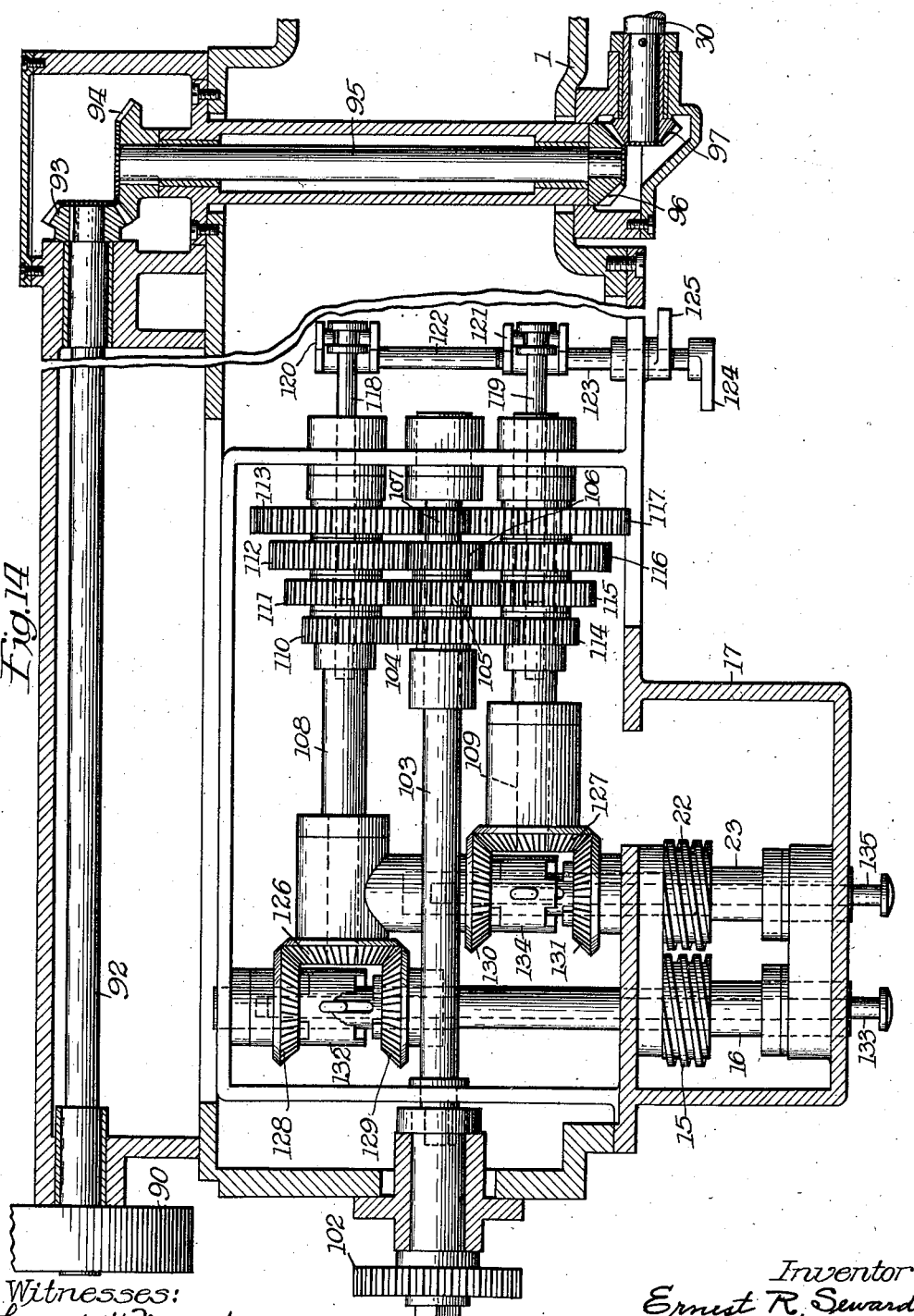

UNITED STATES PATENT OFFICE.

ERNEST R. SEWARD, OF MADISON, WISCONSIN, ASSIGNOR TO GISHOLT MACHINE COMPANY, OF MADISON, WISCONSIN, A CORPORATION OF WISCONSIN.

LATHE.

1,164,759.  Specification of Letters Patent.  Patented Dec. 21, 1915.

Application filed July 28, 1915. Serial No. 42,327.

*To all whom it may concern:*

Be it known that I, ERNEST R. SEWARD, a citizen of the United States, residing at Madison, in the county of Dane and State of Wisconsin, have invented certain new and useful Improvements in Lathes, of which the following is a specification.

This invention relates to improvements in lathes and has for its primary object to provide an improved mechanism for effecting the rapid traverse, feed, and adjusting movements of the turret and carriage slides and for securing a greater degree of independence in such movements between the turret and the carriage slides than has heretofore been attainable in lathes of this type.

A more specific object of the invention is to provide a mechanism through which the turret and carriage slides may be given rapid traverse movements under power and may also be manually adjusted to any desired positions, and wherein, when the power driving connections are thrown in the manual operating devices are automatically disengaged so as to prevent possible injury to the operator through rotation of the handle levers or wheels during the rapid traverse movements, said manual operating devices being automatically restored to operative position at the conclusion of the rapid traverse movement.

Other minor objects and advantages secured by the invention will be apparent as the latter becomes better understood by reference to the following detail description taken in connection with the accompanying drawings illustrating one practical embodiment of the invention wherein—

Figure 10:
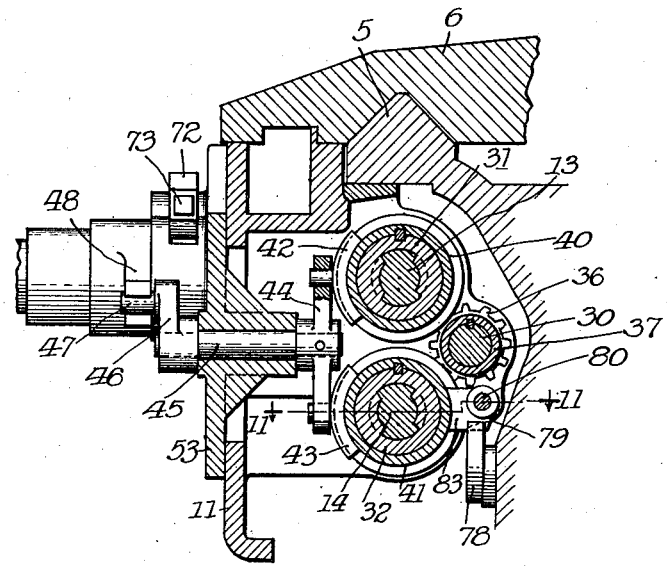
Figure 11:
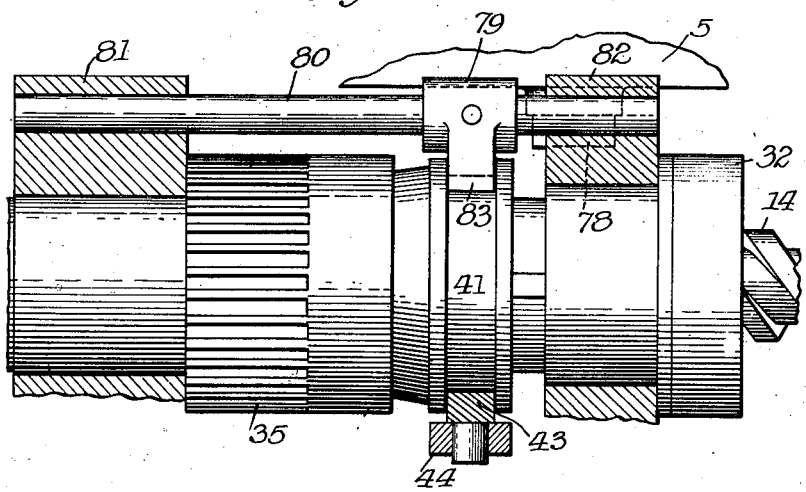
Figure 12:
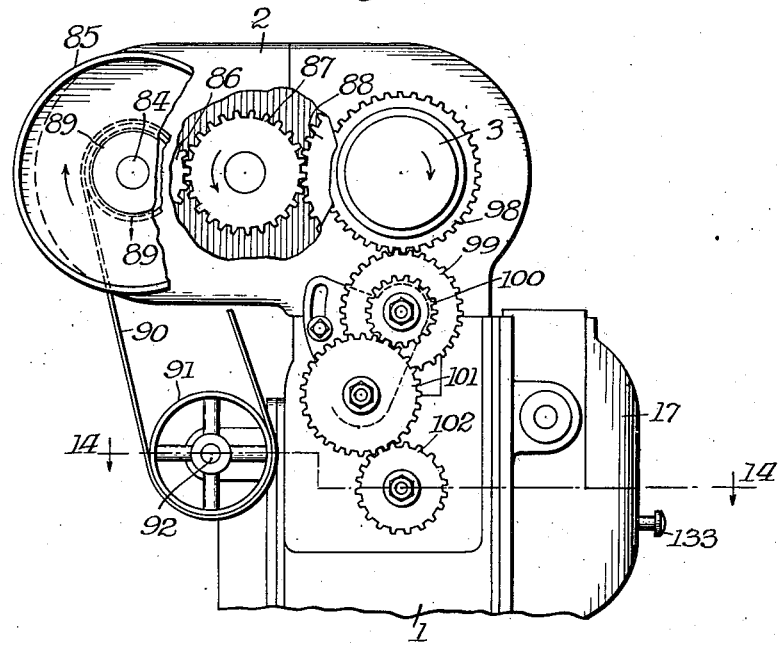
Figure 13:
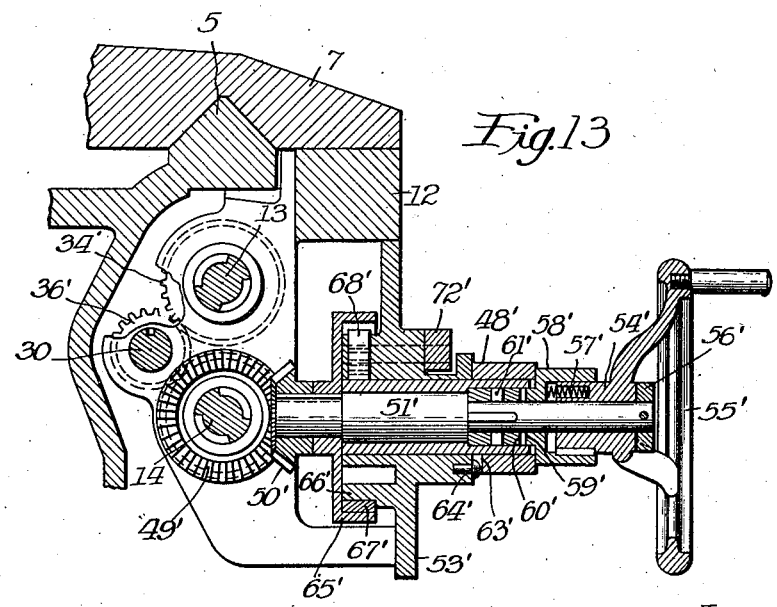

Figure 1 is a side elevational view of the principal features of a lathe embodying the present improvements; Fig. 2 is a detail view partly in side elevation and partly in vertical section through the turret and carriage aprons; Fig. 3 is an enlarged vertical section through the turret apron showing the two lead screws, the nuts engaging the same and the nut rotating devices; Fig. 4 is a cross section on the line 4—4 of Fig. 3; Fig. 5 is a section on the line 5—5 of Fig. 4; Fig. 6 is a cross section on the line 6—6 of Fig. 1; Fig. 7 is a view partly in elevation and partly in cross section on the line 7—7 of Fig. 6 illustrating in part a mechanism for locking one of the lead screw nuts against rotation; Fig. 8 is a detail sectional view on the line 8—8 of Fig. 7; Fig. 9 is a fragmentary detail view illustrating the automatic handle disengaging device; Fig. 10 is a cross section on the line 10—10 of Fig. 1; Fig. 11 is a detail horizontal section on the line 11—11 of Fig. 10 illustrating an automatic stop for arresting the rapid back traverse movement of the turret or cross slide carriage; Fig. 12 is an end elevation of the head stock portion and feed box illustrating driving connections from the power pulley to the lead screws and constant speed shaft; Fig. 13 is a cross sectional view through the carriage apron and the manually operated mechanism for adjusting the carriage taken on the line 13—13 of Fig. 1; Fig. 14 is an enlarged horizontal section through the feed box and a portion of the head stock frame taken on the line 14—14 of Fig. 12.

Referring to the drawings, 1 designates as an entirety the general frame structure of the lathe, at one end of which is the elevated head stock frame 2 carrying the usual spindle 3 and chuck 4. On the usual ways 5 are slidably mounted the turret slide 6 and carriage slide 7 carrying the turret 8 and carriage 9, respectively, said carriage in turn carrying the usual tool post 10. Depending from the front side of the turret slide is the turret apron 11 and similarly depending from the front side of the carriage slide 7 is the carriage apron 12.

Suitably journaled in the main frame structure are a pair of lead screws 13 and 14, mounted the former above the latter. The lead screw 13 is a coarse pitch left hand screw that is driven from a worm 15 on a worm-shaft 16 located in the feed box 17 through a worm-wheel 18 fast on a shaft 19, which is directly connected to the lead screw 13 by an enlarged coupling 20 and key 21. Lead screw 14 is driven in a similar manner from a worm 22 on worm-shaft 23 through worm-wheel 24, the hub of which is journaled on shaft 19 and carries a pinion 25 meshing with a pinion 26 on shaft 27, this latter being directly connected to lead screw 14 by an enlarged coupling 28 and key 29. Slightly behind and between the lead screws is journaled a rapid traverse shaft 30 that is driven from the main driving pulley at a constant speed through mechanism hereinafter described.

Referring principally to Figs. 2 and 3, 31, and 32 designate a pair of lead screw nuts that are duplicates of each other and are journaled in bearings 33 of the turret apron 11. On these nuts are loosely mounted a pair of pinions 34 and 35 respectively, both of which are constantly driven from a pinion 36, Fig. 4, that is splined on the constant speed shaft 30 and is shifted bodily lengthwise of said shaft through end engagement of its hub 37, Fig. 5, with bearings 38 of the apron 11 through which the shaft 30 extends. Pinions 34 and 35 are formed with taper friction surfaces 34$^a$ and 35$^a$ that engage with corresponding tapered ends of sliders 40 and 41 that are mounted on and splined to the lead screw nuts 31 and 32 respectively. The sliders 40 and 41 are shifted into clutch engagement with their respective pinions 34 and 35 by the means best shown in Figs. 1 and 10 and consisting of yokes 42 and 43 engaging grooves in the sliders, a lever 44 carrying said yokes, a rock shaft 45 supported by the apron and carrying said lever 44, an arm 46 on the outer end of shaft 45, a pin 47 on the outer end of arm 46, and a hand lever 48, the short arm of which is forked and engages pin 47.

Referring next to the means for effecting manual adjustment or setting of the turret slide on the ways of the bed, and referring particularly to Figs. 3 and 6, 49 designates a bevel gear fast on one end of the nut 31 which engages with a bevel gear 50 keyed to a pilot wheel shaft 51 that is journaled in a bushing 52 driven into bonnet 53. On the outer end of pilot shaft 51 is loosely mounted the pilot hub 54 carrying four pilot handles 55. The pilot hub 54 is held against a collar 56 keyed on the outer end of shaft 51 by means of springs 57; and on the hub 54 is splined a slidable sleeve 58, one end of which is formed as a toothed clutch member 59. Clutch member 59 engages with a similar clutch member 60 that is secured to shaft 51 by taper pin 61 and key 62. On the outer end of the bushing 52 is pivoted the hand lever 48, above described, the same being the lever that actuates the clutch sliders 40 ad 41. The hub of lever 48 has a V-shaped notch 63 in its inner face which straddles the head of a pin or stud 64 located in the outer end of the bonnet 53, as best shown in Figs. 6 and 9. When it is desired to shift the turret slide by hand feed, the operator revolves the pilot handles 55, and this movement through the clutch 59, 60, shaft 51, and bevel gears 50 and 49, revolves the lead screw nut 31 on the lead screw 13 and imparts a forward or backward movement to the turret apron and slide according to the direction in which the operator turns the pilot handles. The lever 48 is the rapid traverse lever, and when the handle end of the same is raised it engages the clutch slider 40 with the constantly revolving pinion 34 on the lead screw nut 31 and gives a rapid traverse movement of the turret apron in a backward direction. If the handle end of the lever 48 be depressed, the clutch slider 41 is engaged with pinion 35 on lead screw nut 32 and gives a rapid traverse movement to the turret apron in a forward direction owing to the fact that the pitch of lead screw 14 is the reverse of the pitch of lead screw 13. If means were not provided between the lead screw nut 31 and the pilot handles 55 to prevent the latter from revolving during the rapid traverse movements of the apron they would form a source of danger to the operator. Therefore, when lever 48 is raised or lowered to set in action the forward or backward rapid traverse of the apron, one of the cam sides of the notch 63 riding on the pin 64 imparts to the hub of lever 48 a slight endwise movement sufficient to disengage the clutch member 59 from the clutch member 60 in opposition to the springs 57, so that the pilot shaft 51 is free to revolve at a rapid speed when driven by the bevel gears 49 and 50, but the pilot hub 54 and handles 55 will remain stationary when the rapid traverse motion is in use. As soon, however, as lever 48 is returned to its central or neutral position, the springs 57 automatically effect reengagement of the coöperating teeth of clutch members 59 and 60, so that the operator can immediately operate his hand feed as desired.

When it is desired to feed the turret apron and slide forward or backward by means of lead screw 13 revolving at a slow speed in either direction, the lead screw nut 31 is locked against rotation. The means for accomplishing this is most clearly shown in Figs. 6, 7 and 8, wherein 65 is a friction clutch member keyed to shaft 51, and 66 is a coöperating friction clutch member that is turned on the apron bonnet 53 and supports a split friction ring 67 which is adapted to be spread or expanded by a tapered pin 68 slidably mounted in and radially of the hub of bonnet 53 and having rack teeth 69 milled on one side engaging with pinion teeth 70 formed on a short shaft 71 journaled in the hub of bonnet 53, Fig. 8. Keyed to shaft 71 is a hand lever 72 that lies slightly above and substantially parallel with the hand lever 48, and when it is desired to apply the power feed to the turret apron the lever 72 is raised and the split ring friction pin 69 spreads the stationary friction ring 67 and thus locks the outer friction clutch member 65 to the stationary bonnet 53, thereby locking pilot shaft 51 and nut 31 against rotation, so that the turret apron feeds forward at a rate depending upon the speed of the lead screw 13. When the lever 72 is raised to lock the lead screw nut 31 against rotation for purposes of power feed, a block 73 at the right hand end of lever 72, Figs. 1 and 7, engages with a block 74 secured in the lower end of a depending lever arm 75 mounted on shaft 76. The arm 75 is normally urged in the direction indicated by the arrow, Fig. 7, by a spring such as 77, thereby locking lever 72 in the raised position shown by dotted lines in Fig. 7 through the engagement of the lower side of block 74 with the upper side of block 73. When, however, the arm 75 is forced in the opposite direction by a stop mechanism (not shown) the block 74 is retracted and lever 72 drops down, thus unlocking the friction ring clutch and leaving the lead screw nut 31 free to be revolved for a quick traverse motion by operating lever 48, or to be fed by hand through pilot 55. The last described mechanism thus forms an automatic release for the locked lead screw nut at the limit of any predetermined power feed movement.

My invention also contemplates an automatic means for arresting rapid back traverse movement of the apron at the limit of such movement. Referring more particularly to Figs. 10 and 11, 78 designates a block adjustably mounted on the side of the bed in position to be engaged by a block 79 that is secured on a sliding rod 80 journaled in the apron at bearings 81 and 82. Block 79 has a shoe 83 engaging with the annular groove of clutch slider 41, and when the block 79 comes in contact with the fixed block 78 on the bed during the backward traverse of the turret apron, the lever 44 is automatically reversed and clutch slider 40 disengaged from the fast revolving pinion 34. This makes it unnecessary for the operator to keep hold of the lever 48 while the turret slide is traversing back so as to disengage the clutch at the proper time, and prevents the possibility of the turret slide traveling too far.

The description thus far has dwelt chiefly with the mechanism for effecting and controlling the rapid traverse, power feed, and adjusting or setting movements of the turret slide. An identical mechanism is employed for effecting and controlling the same movements of the carriage slide 7, with the exception that the positions of the lead screw nuts 31 and 32 are just reversed, the carriage lead screw nut 31' being engaged with the lower lead screw 14 and the carriage lead screw nut 32' being engaged with the upper lead screw 13. The shaft of the carriage pilot wheel 55' is geared through bevel gears 50' and 49' to the lower nut 31', as clearly shown in Figs. 2 and 13. The substantial identity of the mechanism for locking the nut 31' against rotation and for effecting manual movement of carriage apron with the corresponding mechanism of the turret apron will be apparent from the drawings, and particularly Figs. 2 and 13, wherein, to obviate unnecessary repetition of description, I have identified the corresponding parts with the same reference numerals employed in describing the turret apron mechanism, with an added exponent. The described reverse arrangement of the lead screw nuts of the turret and carriage slides is important, since greatly increasing the independence of the movements and operations which may be effected thereby. This arrangement enables the operator to feed or traverse either the carriage slide or the turret slide entirely independently, since the lead screws 13 and 14 are provided with entirely independent sets of driving mechanism, as hereinafter described. The operator can also apply either the rapid traverse forward or backward movement to either apron while the other one is standing still or being operated by the power feed in either direction. The operator may also have one rate of feed on the carriage slide and an entirely different rate of feed on the turret slide by virtue of the reverse arrangement of the lead screw nuts on the two slides and of the variable speeds at which the two lead screws may be operated.

In Figs. 1, 12 and 14, are illustrated one practical form of driving connections between the head stock spindle and the lead screws 13 and 14 and also a driving connection from the power receiving pulley to the constant speed shaft 30. The spindle 3 is driven from main pulley shaft 84 carrying main driving pulley 85 through a train of gears indicated by 86, 87 and 88, Fig. 12, or any other train of gearing including back gears where desired, this feature forming no part of the present invention. The pulley 85 is, of course, a constant speed pulley and its shaft 84 carries a small pulley 89 which through a belt 90 drives pulley 91 on a horizontal shaft 92 journaled in rear of the feed box 17, Fig. 14. Shaft 92 is geared to shaft 30 by bevel gears 93 and 94, cross shaft 95 and bevel gears 96 and 97. On the rear end of the spindle 3 is a spur gear 98 that, through a train of gears 99, 100, 101 and 102, Fig. 12, drives screw feed shaft 103. Provision may be made for the application of suitable change gears between the spindle gear 98 and the feed shaft gear 102, as indicated in Fig. 12, if desired. On the inner end of shaft 103 is secured a cone of four feed gears 104, 105, 106 and 107, which drives corresponding gears running loosely on counter shafts 108 and 109. Shaft 108 carries a cone of four loose gears 110, 111, 112 and 113 and shaft 109 carries a similar cone of loose gears 114, 115, 116 and 117. The loose gears on the shafts 108 and 109 are provided with the usual internal sliding keys that are operated by rods 118 and 119, respectively, connected through arms 120 and 121 and shafts 122 and 123 with manually operable levers 124 and 125, through the manipulation of which variations in speed of the shafts 108 and 109, within the limits permitted by the cone gear arrangement, may be secured. Shaft 108 carries bevel gear 126 keyed to the same and shaft 109 carries a similar bevel gear 127 keyed thereto. Bevel gear 126 engages a pair of loose bevel gears 128 and 129 on worm shaft 16 and bevel gear 127 similarly engages a pair of loose bevel gears 130 and 131 on worm shaft 23. Between the bevel gears 128 and 129 is a double faced clutch 132 splined to worm shaft 16 and operated by a pull pin 133 extending through the latter. Splined on worm gear shaft 23 between bevel gears 130 and 131 is a similar double faced clutch 134 operated by a pull pin 135 extending through worm shaft 23. By manipulating the pull pins 133 and 135 the worms 15 and 22, and consequently the lead screws 13 and 14 can be driven in either direction at will; and by manipulating the levers 124 and 125 the speeds of rotation of the feed screws may be varied as desired within the limits of the mechanism.

From the foregoing description, it will be seen that in the mechanism illustrated, one nut of each pair, when driven by the constantly revolving pinion on shaft 30, effects a backward rapid traverse of the slide in which it is mounted and the other a forward rapid traverse; and further, that the nut of each pair to which the hand feed and the locking mechanism are geared is the nut that is instrumental in effecting both power feed and hand feed of the slide in which it is mounted. By mounting the latter nut on one lead screw in the case of the turret slide and on the other lead screw in the case of the carriage slide, complete independence between the various movements of the two slides is obtained, as already pointed out.

To those skilled in the art it will be apparent that the mechanism herein illustrated and described for performing the functions and accomplishing the purposes of the invention may be variously modified in matters of detail without involving any change of principle, and hence I reserve all such variations and modifications as fairly fall within the terms and spirit of the appended claims.

I claim:

1. In a lathe, the combination with the ways of the lathe-bed, of a tool-carrier slide mounted on said ways and having an apron, a pair of lead screws, a pair of nuts journaled in said apron and engaging said lead screws respectively, and power operated means for rotating either of said nuts at will, such rotation of one of said nuts effecting a rapid traverse of the slide in one direction, and such rotation of the other nut effecting a rapid traverse of the slide in the opposite direction.

2. In a lathe, the combination with the ways of the lathe-bed, of a tool-carrier slide mounted on said ways and having an apron, a pair of lead screws and means for rotating the same, a pair of nuts journaled in said apron and engaging said lead screws respectively, power operated means for rotating either of said nuts at will, such rotation of one of said nuts effecting a rapid traverse of the slide in one direction, and such rotation of the other nut effecting a rapid traverse of the slide in the opposite direction, and means for locking one of said nuts against rotation whereby to effect a power feed movement of said slide.

3. In a lathe, the combination with the ways of the lathe-bed, of a tool-carrier slide mounted on said ways and having an apron, right and left pitch lead screws, a pair of nuts journaled in said apron and engaging said lead screws respectively, and power operated means for rotating either of said nuts in the same direction at will, whereby such rotation of one of said nuts effects a rapid traverse of the slide in one direction and such rotation of the other nut effects a rapid traverse of the slide in the opposite direction.

4. In a lathe, the combination with the ways of the lathe-bed, of a tool-carrier slide mounted on said ways and having an apron, right and left pitch lead screws and means for rotating the same, a pair of nuts journaled in said apron and engaging said lead screws respectively, power operated means for rotating either of said nuts in the same direction at will, whereby such rotation of one of said nuts effects a rapid traverse of the slide in one direction and such rotation of the other nut effects a rapid traverse of the slide in the opposite direction, and means for locking one of said nuts against rotation whereby to effect a power feed movement of said slide.

5. In a lathe, the combination with the ways of the lathe-bed, of a tool-carrier slide mounted on said ways and having an apron, a pair of lead screws, means for rotating said screws independently in either direction and at variable speeds, a pair of nuts journaled in said apron and engaging said lead screws respectively, power operated means for rotating either of said nuts at will whereby to effect rapid traverse movements of said slide, and means for locking one of said nuts against rotation whereby to effect a power feed movement of said slide.

6. In a lathe, the combination with the ways of the lathe-bed, of a tool-carrier slide mounted on said ways and having an apron, right and left pitch lead screws, means for rotating said screws independently in either direction and at variable speeds, a pair of nuts journaled in said apron and engaging said lead screws respectively, power operated means for rotating either of said nuts in the same direction at will whereby to effect rapid traverse movements of said slide, and means for locking one of said nuts against rotation whereby to effect a power movement of said slide.

7. In a lathe, the combination with the ways of the lathe-bed, of a tool-carrier slide mounted on said ways and having an apron, a pair of lead screws, a pair of nuts journaled in said apron and engaging said lead screws respectively, pinions journaled on said nuts, clutches for rendering said pinions fast with said nuts, a manually operable clutch-shifting mechanism, a constantly running shaft, and a pinion splined on said shaft and in driving engagement with both of said first named pinions.

8. In a lathe, the combination with the ways of the lathe-bed, of a tool-carrier slide mounted on said ways and having said apron, a pair of lead screws, a pair of nuts journaled in said apron and engaging said lead screws respectively, pinions journaled on said nuts, clutches for rendering said pinions fast with said nuts, a manually operable clutch-shifting mechanism, a constantly running shaft, a pinion splined on said shaft and in driving engagement with both of said first named pinions, and automatic clutch-disengaging means operative at the limit of a rapid traverse movement of said slide.

9. In a lathe, the combination with the ways of the lathe-bed, of a tool-carrier slide mounted on said ways and having an apron, a pair of lead screws, a pair of nuts journaled in said apron and engaging said lead screws respectively, power operated means for rotating either of said nuts at will whereby to effect rapid traverse movements of said slide, and manually operable means for rotating one of said nuts to effect adjustment of said slide lengthwise of said ways.

10. In a lathe, the combination with the ways of the lathe-bed, of a tool-carrier slide mounted on said ways and means for rotating the same, a pair of nuts journaled in said apron and engaging said lead screws respectively, power operated means for rotating either of said nuts at will whereby to effect rapid traverse movements of said slide, means for locking one of said nuts against rotation whereby to effect a power feed movement of said slide, and manually operable means for rotating one of said nuts to effect adjustment of said slide lengthwise of said ways.

11. In a lathe, the combination with the ways of the lathe-bed, of a tool-carrier slide mounted on said ways and having an apron, a pair of lead screws, a pair of nuts journaled in said apron and engaging said lead screws respectively, power operated means for rotating either of said nuts at will whereby to effect rapid traverse movements of said slide, a pilot shaft geared to one of said nuts, pilot handles having a clutch connection to said pilot shaft, and means for automatically disengaging said clutch connection when either of said nuts is engaged with said power operated means.

12. In a lathe, the combination with the ways of the lathe-bed, of a tool-carrier slide mounted on said ways and having an apron, a pair of lead screws, a pair of nuts journaled in said apron and engaging said lead screws respectively, power operated means for rotating either of said nuts at will whereby to effect rapid traverse movements of said slide, a pilot shaft geared to one of said nuts, pilot handles having a clutch connection to said pilot shaft, means for automatically disengaging said clutch connection when either of said nuts is engaged with said power operated means, and automatic means for reëngaging said clutch when either of said nuts is disengaged from said power operated means.

13. In a lathe, the combination with the ways of the lathe-bed, of a tool-carrier slide mounted on said ways and having an apron, a pair of lead screws, a pair of nuts journaled in said apron and engaging said screws respectively, power operated means for rotating either of said nuts at will, including a pair of clutches, for rotating either of said nuts at will, a clutch-shaft, a pilot shaft geared to one of said nuts, pilot handles mounted on said shaft, a normally engaged spring-actuated clutch connecting said pilot handles and pilot shaft, and means for disengaging said clutch-shifting lever for disengaging said spring-actuated clutch when either first-named clutches is driving its respective nut.

14. In a lathe, the combination with the ways of the lathe-bed, of turret slides mounted on said ways and having an apron, a pair of lead screws for rotating the same, means for rotating the turret apron journaled in the turret apron, a pair of said screws respectively, a pair of nuts journaled in the carriage apron, respectively, means for rotating either of said screws, means for locking said turret apron nut that either will, means for locking said carriage apron lead screws, and means for rotation the carriage apron against rotation the other of said lead screws.

15. In a lathe, the ways of the lathe-bed, ways mounted on said ways and each having an apron, a pair of lead screws, a pair of nuts journaled in the turret apron and engaging said screws respectively, a pair of nuts journaled in the carriage apron and engaging said screws respectively, power operated means for rotating either nut of each pair at will, manually operated means for rotating a turret apron nut that engages one of said lead screws, and manually operated means for rotating the carriage apron nut that engages the other of said lead screws.

16. In a lathe, the combination with the ways of the lathe-bed, of turret and carriage slides mounted on said ways and each having an apron, a pair of lead screws and means for rotating the same, a pair of nuts journaled in the turret apron, and engaging said screws respectively, a pair of nuts journaled in the carriage apron and engaging said screws respectively, power operated means for rotating either nut of each pair at will, means for locking against rotation a turret apron nut that engages one of said lead screws, manually operable means for rotating said last-named nut, means for locking against rotation the carriage apron nut that engages the other of said lead screws, and manually operable means for rotating said last-named nut.

17. In a lathe, the combination with the ways of the lathe-bed, of turret and carriage slides mounted on said ways and each having an apron, right and left pitch lead screws, means for rotating said screws independently in either direction and at variable speeds, a pair of nuts journaled in the turret apron and engaging said screws respectively, a pair of nuts journaled in the carriage apron and engaging said screws respectively, clutch-controlled power operated means for rotating either nut of each pair in the same direction, means for locking against rotation a turret apron nut that engages one of said lead screws, manually operable means for rotating said last-named nut, means for locking against rotation the carriage apron nut that engages the other of said lead screws, and manually operable means for rotating said last-named nut.

ERNEST R. SEWARD.